Patented Apr. 14, 1925.

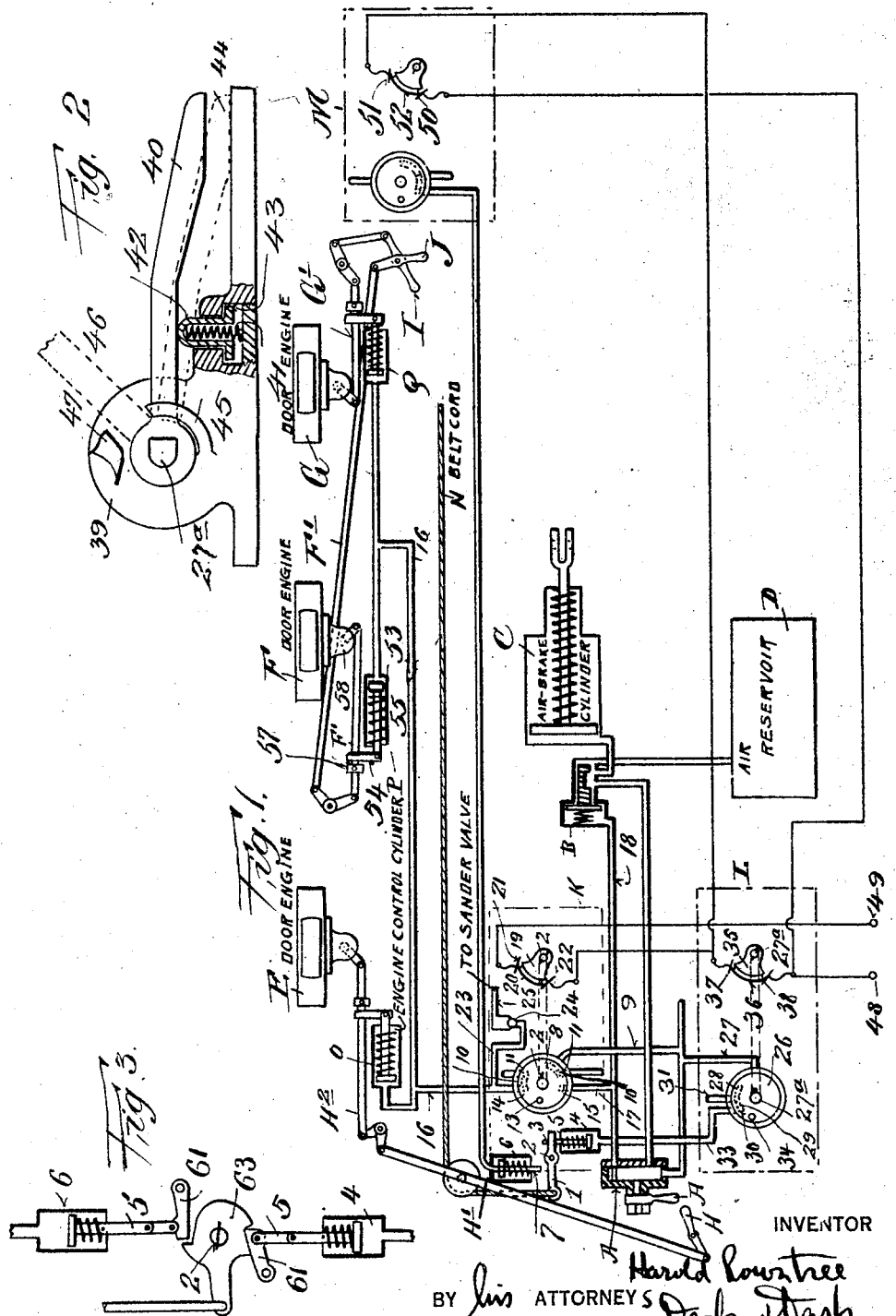

1,533,142

UNITED STATES PATENT OFFICE.

HAROLD ROWNTREE, OF PASS CHRISTIAN, MISSISSIPPI, ASSIGNOR TO NATIONAL PNEUMATIC COMPANY, OF NEW YORK, N. Y., A CORPORATION OF WEST VIRGINIA.

SAFETY CONTROL MECHANISM FOR CARS.

Application filed July 9, 1921. Serial No. 483,410.

*To all whom it may concern:*

Be it known that I, HAROLD ROWNTREE, a citizen of the United States, residing at Pass Christian, county of Harrison, State of Mississippi, have made a certain new and useful Invention in Safety Control Mechanism for Cars, of which the following is a specification.

This invention relates to safety control mechanism for cars, for example, street railway cars, wherein the object is to provide an emergency control for such cars, which emergency control is available to passengers in case of accident or unforeseen necessity.

The object of the invention is to provide in such a safety control mechanism means for rendering the passengers' emergency control inoperative so long as the control of the car is normal. In other words, it may be broadly stated that my invention consists in providing in addition to the usual safety features of car operation an emergency control capable of being operated by any passenger in the car to automatically operate any operable part of the car incident to safety or speedy exit, such as shutting off the power, applying the brakes, or opening the doors, accomplished either separately or all simultaneously, or in any desired combination, and which emergency or passenger control may be maintained inoperative by the car operator, such as the motorman, the conductor, or both, so long as the operating conditions are normal.

In car operation, it is, or has been, the practice, to apply safety apparatus capable of operation by a passenger for either notifying the motorman, engineer, conductor, etc., that something abnormal has happened, or for automatically applying the brakes, or shutting off the propelling power, or both. This is open to the objection that the emergency operation is capable of actuation by a passenger through malicious mischief, or through ignorance, or accident, causing unnecessary confusion, delay, disarrangement of operating schedule, and in some instances, injury to the passengers due to the sudden emergency operation when the actuation thereof is wholly unwarranted and in consequence unexpected. These considerations have largely been responsible for the elimination, especially in street railway work, of emergency acts under the control of passengers. At the present time, in what is known as one and two man cars, i. e., where the motorman acts as both motorman and conductor, controls the operation of the car motor, door, brakes, and collects fares, makes change, etc., or, where both a motorman and a conductor are employed, it is the general practice for the motorman to have the entire control of the car operation, whether it be emergency operation or normal operation. With reference to the one man car particularly, where the motorman is required to handle and give attention to so many different duties, the element of safety to the car and its passengers has necessitated the provision of means for controlling the car motor and brake whereby the motorman is compelled to put the operative device in an abnormal condition to cause the car to move. For example, it has been the general practice to require the motorman to move against a normal tension a lever, handle, or the like, in order to release the brakes and supply current to the car propelling motor on the theory that in the event of an accident to the motorman, for example, if he should faint, to thereby release the lever, handle, or the like, the same would return to its normal position necessitating, and in fact initiating the operation of mechanism which applies the brakes and shuts off current to the motor. While the provision of this safety feature in one man cars has been recognized as an advancement where economy in operators is a desired feature, it has likewise been recognized that the weak point in the system, and in fact a most serious objection thereto, is that in the event of accident other than to the motorman the passengers' safety depends practically entirely upon the coolheadedness, wit, and courage of the motorman. For example, if the car was being propelled across railroad tracks and the motorman saw a train bearing down upon him, and acting instinctively under the law of self preservation, should jump from his position towards safety which would necessitate abandoning the car or moving from his position, the current to the motor controller would be shut off and the car brakes applied so that even should the motorman escape the car and its passengers are completely abandoned with no power to save themselves. It will therefore be seen that my present invention overcomes this most serious objection and provides means which will permit any passenger to apply the brakes and shut off current to the motor controller in the event of accident or abnormal conditions, but in addition thereto, whenever the emergency control by the passengers is inoperative it may be maintained inoperative by the motorman, in case it is a one man car, or by either or both motorman and conductor in the event it is a two man car, so long as the motorman and conductor are in their normal positions and the matters or duties within their respective or individual provinces are normally being attended to.

Other objects of my invention together with means for accomplishing the purposes thereof will readily be apparent to those skilled in the art by an inspection of the drawings taken in connection with the following description thereof wherein Fig. 1 is a diagrammatic view of a system embodying my invention applied to either a one or two man car layout.

Figs. 2 and 3 are detached diagrammatic fragmentary views illustrating equipment employed in accordance with my invention.

The same part is designated by the same reference character wherever it occurs throughout the several views.

In Fig. 1 of the drawing, reference letter A designates the motorman's air-brake valve, B the triple valve, C the air-brake cylinder, and D the air reservoir. E, F and G designate the pneumatic door engines employed for opening and closing the doors, and it is wholly immaterial whether there be one or more doors with one or more engines for controlling the same. I have illustrated, however, three engines controlling two end doors and one side door. It is further wholly immaterial what type of door is employed, whether it be of the foldable or sliding type. H designates the door engine operating handle used by the motorman controlling the operation of the door at his end of the car, which control is effected through levers H¹, H², to control the valve of the pneumatic engine E. The operation of the motors F and G is secured through levers F¹, G¹, and operating handles J and I respectively stationed at the conductor's station, in the case it is a two man car.

The apparatus thus far described all consists of standard equipment now in common use in the art, and which is not changed in any respect by the emergency attachments embodying my invention.

For the sake of convenience of description of the invention herein disclosed, the apparatus enclosed by the dash lines K may be termed the emergency cord operating valve and switch, which is utilized in accordance with my invention, and will be more fully hereinafter described both as to structure and operation. Similarly, the apparatus enclosed in dash lines L and M will be referred to as the foot operated switch and valve. These two pieces of apparatus are of similar construction and operation, one of them being located convenient to the motorman, and the other located convenient to the conductor. A full description thereof together with the operation and function thereof will be more fully hereinafter given. O, P and Q designate engine control operating cylinders for respectively controlling the pneumatic motors E, F and G, and form a part of the apparatus employed in accordance with my invention, to effect the results and objects contemplated thereby.

With the foregoing brief general description of the various parts of the apparatus in accordance with their function and a distinction between the apparatus ordinarily employed at the present time and the attachments or devices contemplated by the use of my invention, I will now proceed to describe the emergency cord operating valve and switch apparatus enclosed within the dash lines K. Reference numeral 1 designates a lever pinned or otherwise secured to a shaft 2, and the lever is normally positioned with one end thereof resting against a stop pin 3. Reference numeral 4 designates a small air operated cylinder, through one end of which projects a stem 5 of a plunger, so arranged within the cylinder 4 by means of a coil spring for example, that when air pressure is applied to the rear end of the cylinder 4 the plunger 5 is pushed upwardly against the action of the coil spring, so that the stem 5 thereof engages the end of the lever 1, and holds it rigidly against its stop pin 3. The cylinder 4, as will be more fully hereinafter set forth, is under the control of the motorman, and when a two man car is employed I provide a similar cylinder 6 with a similar plunger stem 7 bearing against the top surface of the lever 1 on the other side of the shaft 2 to similarly maintain the lever 1 in the position of limit of movement against the stop pin 3. The cylinder 6, in this instance, is under the control of the conductor. It will therefore be seen that if either the motorman or conductor allows air pressure to enter the cylinders 4 and 6 that the lever 1, and consequently shaft 2, cannot be rotated. If, however, fluid pressure is not in either of the cylinders 4 and 6, lever 1, and consequently shaft 2, may be rotated. I have shown one means whereby this may be accomplished wherein the end of the lever 1 is connected to a bell cord N, which may be an emergency or bell cord extending through the car within easy reaching distance of any of the passengers thereof. Attached to the shaft 2 is a valve 8 so arranged that the valve will move in a rotary direction as shaft 2 is rotated. The chamber in which this valve is located gets a constant supply of compressed air through pipe 9, this air being on top of the valve, as in the common valve structure employed in the pneumatic art holds the valve constantly on its seat. On the lower face of the valve are two cavities 10, which register with ports 11 in the valve seat, which ports lead to open air exhaust or atmosphere. Extending through the valve 8 is a hole or port 13 in such position that when the valve is rotated, say, clockwise, the hole 13 will register with a port 14 in the valve seat. On the opposite side of the valve seat there is a similar port 15. It will therefore be seen that when the shaft 2 is rotated, say, in a clockwise direction, to thereby rotate the valve 8, it will be apparent that if the lever 1 is rocked clockwise to thereby rotate the shaft 2 clockwise, and further provided that air cylinders 4 and 6 are not charged with air so that their plungers will hold lever 1 in rigid position against its stop pin 3, that the valve 8 will be shifted from the position shown so that the exhaust cavity 10 is moved from port 14, and hole 13, which goes completely through the valve, will register with the port 14, thus allowing fluid pressure to flow from the source of supply, through pipe line 9, hole 13, port 14, pipe line 16, and thence to the respective cylinders O, P and Q. At the same time the other cavity 10 will be moved into such a position that it will bridge ports 11 and 15, thus exhausting any compressed air that may be in pipe line 17 by reason thereof. Pipe 18 is included, as will be apparent, in the brake system, and is kept constantly charged with fluid pressure through the air-brake valve A, which is of the usual standard type of construction, unless it is desired to put full emergency air pressure in the air-brake cylinder C through the operation of the triple or three-way valve B, in the usual well known manner. Therefore on account of the pipe 17 being directly connected to pipe 18, as soon as pipe 17 is connected to exhaust by the rotation of the valve 8, the emergency air pressure is applied to the air-brake cylinder because of the draining of fluid pressure at the pipe 18, as will be readily understood.

Also rigidly attached to shaft 2 is a casting 19, which carries a contact strip 20, the contact strip being insulated electrically from the casting 19. Resting against contact strip 20 are fingers 21 and 22, in such a way as to carry electrical current from finger 21 to finger 22 when the contact strip is in the position indicated in the drawing. When fluid pressure is supplied to pipe line 16 by reason of the rotation of the shaft 2, as hereinbefore described, pipe line 23, which is a branch connected with pipe line 16, is simultaneously supplied with the fluid pressure which passes by the check ball 24 into pipe 25, which connects to the air operating sander valve (not shown), the function of which is to drop a certain amount of sand on the track in front of the wheels, giving them additional traction to assist in rapidly retarding the car when the emergency brakes are applied. Sander valves, their structure, and their operation are well understood in the art, and have been for many years, and are merely mentioned in this connection to show that the operation of my device for any purpose may be secured pneumatically, electrically, electro-pneumatically, mechanically, or otherwise, by the rotation of the shaft 2 secured in accordance with the principles of my invention herein contained. In the arrangement illustrated, the object of the ball check 24 is to allow the pipe 25 to be charged with air from another source if it is desired not to sand the track with the normal applications of the brake through the air-brake valve A.

As the foot operated switch and valve contained in the dash lines L and M are the same, it will be necessary to describe but one of them to enable a full understanding of the principle of operation thereof. 26 is a rotary valve attached to a stem 27$^a$, so that when the stem is rotated a corresponding rotation is imparted to the valve. A constant supply of compressed air is furnished the valve through pipe line 27, the air going on top of the valve, holding it on its seat, in accordance with the present practice in pneumatic valve structures. On the under surface of the valve are cavities 28 and 29 made for the purpose of simplicity of description in one single elongated cavity. In the position shown, cavity 29 bridges ports 30 and 31. Port 31 is open to atmosphere or open exhaust, while port 30 is connected through a pipe line 33 to the cylinder 4, therefore in the position shown pipe line 33 is in communication through port 30, cavity 29, with the exhaust 31. 34 is a hole extending entirely through the valve, and therefore by shifting the valve clockwise, hole 34 will be made to register with port 30, and cavity 29 will be removed from port 30, and the compressed air on top of the valve will be fed through the port 34 and port 30 into the pipe line 33, which will actuate the plunger within the cylinder 4, locking the lever 1 against rotation on its shaft 2. Rigidly attached to the stem or shaft 27$^a$ of the valve 26 is a casting 35, which carries a contact strip 36, contact strip being electrically insulated from the casting 35. Resting against the contact strip 36 are contact fingers 37 and 38.

Now referring to Fig. 2 which illustrates a side elevation of the conductor's and motorman's foot switch and valve, the foot switch or pedal 40 is shown in its normal position in full lines when not depressed by the foot. It is held in its normal position by means of a spring 41 acting through a plunger 42, the plunger being limited in its upward movement by a shoulder 43 at the bottom thereof. The depressed position of the foot pedal 40 is shown in dotted lines, in which position of course it will have depressed the plunger 42 and compressed the spring 41 thereof. As soon as foot pressure has been removed from the pedal the plunger 42 will immediately cause the foot pedal to be raised to its full line position. The pedal is attached to the stem or shaft 27ª of the valve 26 in any suitable manner, for example, by fitting the same over the end of the stem, which is preferably squared on three sides and curved on its fourth side to insure the foot pedal being placed on the stem or shaft 27ª in its correct relation to the valve, and at the same time giving a positive movement in a rotary direction to the valve when the pedal is moved up or down by foot pressure or plunger. The valve casing 39 is provided with a projection 45 to prevent sidewise movement of the foot pedal 40 when in its assembled position. It will be apparent that the side of the casing 39 and the projection 45 form a slot therebetween in which the pedal 40 operates. It will be seen therefore that the only way in which the pedal 40 may be removed or positioned on the stem 27ª is by moving it into a forward position as shown in dotted lines at 46 when it will be free to be slipped sidewise onto or off of the stem 27ª. Casing 39 is also provided with a lug 47 which forms a limit to prevent the foot pedal 46 from being raised too far when it is desired to remove the same from the stem 27ª. At all times when the pedal 40 is in the position shown in full lines, or in the position shown at 44, electrical contact is made through the strip 36 from finger 37 to finger 38, but when the pedal is in the position indicated by dotted lines 46 electrical contact is broken between contact fingers 37 and 38 by the strip 36 being moved to such an extent that it passes from under finger 37. In the positions 46 and 40 of the pedal the air pipe 33 is connected to exhaust port 31, but in the position 44 of the foot lever air pipe 33 is supplied with fluid pressure through the hole 34 in the valve 26 as hereinbefore described.

It will be seen therefore that the foot switch and valve or apparatus L and M being the same, in order to get electrical current from binding post 48 to binding post 49 it is necessary to have electrical contact between the fingers 21 and 22 by means of contact strip 20, and electrical contact either between fingers 37 and 38 through strip 36, or through fingers 50 and 51 through contact strip 52. To the binding posts 46 and 49 are attached the circuit that includes the lifting coil on the contactor used in the usual motor control systems employed in this art and well known and understood. Therefore in order to energize the lifting coil of the contactor, it is necessary that the lever 1 and either the motorman's foot valve or the conductor's valve must be in the position corresponding to either of the positions 40 or 44. This guards against the possible carelessness on the part of train crews in not putting their pedals into the foot operated valve and switch before starting the car. It will also be noticed that the switches in conjunction with the apparatus L and M are connected up in parallel so that the conductor's pedal can be removed if the car is to be run and controlled by one man, and although his switch may be open the circuit can be completed from the motorman's operated valve and switch. It will also be seen that when the conductor's foot operated valve and switch is left in the position when the pedal is removed cylinder 6 is open to atmosphere and the emergency cord N and its lever 1 is entirely under the control of the motorman so far as working the emergency features of the car is concerned.

I will now describe the door engine control operating cylinders O, P and Q. Inasmuch as these three pieces of apparatus are the same in structure and operation and are connected in parallel a description of one will be sufficient. 53 designates a piston which operates in the cylinders as shown, to the rod of which is attached a yoke 54. Around the piston rod is a spring 55, which, when no air is admitted behind the piston, forces the piston and piston rod to its normal position such as is shown in the drawings. The yoke 54 is slidably mounted on the operating lever F¹ so that the lever F¹ can pass forward and backward in the normal operation of the lever F¹ without affecting the yoke 54. The lever F¹ however is provided with a collar 57 rigidly attached thereto and positioned so that if the door engine valve 58 is in the position to close the door by means of the door engine F the collar is in close proximity to the yoke 54. By admitting fluid pressure into the pipe line 16 in the manner hereinbefore described, piston 53, and in consequence yoke 54, are moved, whereby the yoke engages the collar 57 and shifts the engine valve 58 to its door opening position, thereby opening the door controlled by the engine F. As above stated, it will readily be seen that the engine control operating cylinders O, P and Q being connected to the same pipe line 16, the three pistons thereof will operate in unison, opening the doors controlled by the motors E, F and G when fluid pressure is supplied in the manner hereinbefore described to the pipe line 16.

It will be seen from the foregoing description that the electric circuit control of the car motor cannot be effected unless the motorman or the conductor, in the event it is a two man car control, has positioned his valve 26 so that the shaft 27ª is in a position which establishes the circuit connection between the fingers 37 and 38, through the medium of the bridging strip 36 or the circuit connection between fingers 50 and 51 through the bridging strip 52. It also will be apparent that no propelling current can be obtained unless the emergency cord N is free from the necessary strain or weight to rock the lever 1 away from its stop pin 3. When these conditions have been fulfilled then the valve 26 is in the position corresponding to the position imparted thereto by the foot pedal 40 when it is in its full line position 40 or dotted line position 44. The foregoing expression is used because it is not desired to limit the valves to a foot lever control as it is apparent that the operation of the valve may be acomplished in many other ways as the foot lever control is only one efficient means contemplated in accordance with my invention. It will further be seen that if the valve 26 is actuated by means of the foot pedal 40 by either the motorman or conductor into its dotted line position 44 that fluid pressure is supplied to the cylinders 4 and 6 as hereinbefore described to lock the lever against rotation. It will further be seen that if only the motorman has his switch and valve in position to lock the lever 1, only the cylinder 4 would be supplied with fluid pressure. Similarly, if it were only the conductor, in the case of a two man car, who had his valve and switch in the required position, cylinder 6 would be the one which would effect the locking of the emergency cord in an inoperative condition. It will also be apparent that if both the motorman and conductor have their valve and switch in the proper position both cylinders 4 and 6 will function in this manner. When, however, both the motorman and the conductor take their foot off of the pedal 40 so that it assumes the full line position shown in Fig. 2, while their respective switches are maintained closed, so that current is available for propulsion of the car, cylinders 6 and 4 will open to exhaust, so that the passenger may, if necessary, pull the emergency cord, rock the lever 1, and in consequence shaft 2, and secure the desired operation of the safety appliances. In the illustration that has been made of the invention it will readily be apparent that an operation of the safety or emergency cord N, the rocking of the lever 1 and shaft 2, will accomplish four things, namely, it will shut off current to the car motor by reason of breaking the contact between contact terminals 21 and 22; it will apply the brakes by reason of exhausting the fluid pressure from the pipe line 17; open the doors by reason of supplying fluid pressure to pipe line 16, actuating pistons 53, and shifting valves 58 of the motors E, F and G, etc.; and will actuate the sander valve and drop sand on the tracks through supplying fluid pressure to the connection 25.

By making the cylinders 4 and 6 large enough the admission of fluid pressure thereto would cause the actuation of the pistons thereof with such power as to hold the lever 1 against its stop in opposition to any practical pull within the breaking limits of the emergency cord N that might be exerted thereon. It might be desirable that this should not be the case, and I have shown therefore in Fig. 3 an arrangement whereby the air in cylinders 4 and 6 would cause the piston stems 5 to engage pawls 61 in a ratchet 63 attached rigidly to the shaft 2. In this way the failure of air to be in the cylinders 4 and 6 would allow the emergency cord to be pulled and shift ratchet 63, but after it was once pulled to the position where the pawls engage in their notches in the ratchet 63 the application of air to the cylinders 4 and 6 would not affect the ratchet 63 in its normal position or resist the pull on the emergency cord.

From the above it will readily be seen that in case of a two man car, if the motorman either through inattention or being incapacitated, loses control of the car, the conductor can use his foot valve and switch and prevent a passenger from working the emergency attachments through the emergency cord N, thus assuming the control of the car, or he can by releasing his foot operated valve and switch, and by pulling the emergency cord N shut off the power, apply the emergency application of the brakes and sand the track.

When the car is being run by one man, if the motorman loses control of the car, and has not his foot on the pedal of the foot valve and switch any passenger can pull the emergency cord N, shutting off the power, applying the emergency application to the brakes and sand the track.

Many modifications and changes in detail in structural arrangement will readily occur to those skilled in the art without departing from the spirit and scope of my invention as defined in the claims. Therefore what I claim as new and useful and of my own invention and desire to secure by Letters Patent is,—

1. In a car operating system, the combination with normal car operation devices, of emergency means for controlling said normal car operation devices, and means controlled by a car attendant for rendering said emergency controlling means inoperative.

2. In a car operating system, the combination with normal car operation devices, of emergency means for controlling said normal car operation devices, and means controlled by the motorman of the car for rendering said emergency controlling means inoperative.

3. In a car operating system, the combination with normal car operation devices, of emergency means for controlling said normal car operation devices, and means controlled by the conductor of the car for rendering said emergency controlling means operative.

4. In a car operating system, the combination with normal car operation devices, of emergency means for controlling said normal car operation devices, and means controlled by the motorman or the conductor of the car for rendering said emergency controlling means ineffective.

5. In a car operating system, the combination with normal car operation devices, of emergency means accessible to the passengers of the car for controlling said normal car operation devices, and means controlled by the car attendant for rendering said emergency controlling means ineffective.

6. In a car operating system, the combination with normal car operation devices, of emergency means for controlling said normal car operation devices, and means normally tending to maintain said emergency controlling means in an operative condition, and means controlled by a car attendant for rendering said emergency controlling means inoperative.

7. In a car operating system, the combination with normal car operation devices, of emergency means for controlling said normal car operation devices, and means normally tending to maintain said emergency controlling means in an operative condition, and means controlled by the motorman of the car for rendering said emergency controlling means inoperative.

8. In a car operating system, the combination with normal car operation devices, of emergency means for controlling said normal car operation devices, and means normally tending to maintain said emergency controlling means in an operative condition, and means controlled by the conductor of the car for rendering said emergency controlling means inoperative.

9. In a car operating system, the combination with normal car operation devices, of emergency means for controlling said normal car operation devices, and means normally tending to maintain said emergency controlling means in an operative condition, and means controlled by the motorman or the conductor of the car for rendering said emergency controlling means inoperative.

10. In a car operating system, the combination with normal car operation devices, of emergency means accessible to the passengers of the car normally tending to maintain said emergency controlling means in an operative condition, and means controlled by a car attendant for rendering said emergency controlling means inoperative.

11. In a car operating system, the combination with normal car operation devices, of emergency means for controlling said normal car operation devices, and pneumatically operated means controlled by a car attendant for rendering said emergency controlling means inoperative.

12. In a car operating system, the combination with normal car operation devices, of emergency means for controlling said normal car operation devices, and pneumatically operated means controlled by the motorman of the car for rendering said emergency controlling means inoperative.

13. In a car operating system, the combination with normal car operation devices, of emergency means for controlling said normal car operation devices, and pneumatically operated means controlled by the conductor of the car for rendering said emergency controlling means inoperative.

14. In a car operating system, the combination with normal car operation devices, of emergency means for controlling said normal car operation devices, and pneumatically operated means controlled by the motorman or the conductor of the car for rendering said emergency controlling means inoperative.

15. In a car operating system, the combination with normal car operation devices, of emergency means accessible to the passengers of the car for controlling said normal car operation devices, and pneumatically operated means controlled by a car attendant for rendering said emergency controlling means inoperative.

16. In a car operating system, the combination with normal car operation devices, of emergency means for controlling said normal car operation devices, and means normally tending to maintain said emergency controlling means in an operative condition, and pneumatically operated means controlled by a car attendant for rendering said emergency means inoperative.

In testimony whereof I have hereunto set my hand on this 6th day of July, A. D. 1921.

HAROLD ROWNTREE.